March 28, 1967  T. E. FOSTER  3,311,116
DENTAL FLOSS HOLDER AND DISPENSER
Filed Nov. 20, 1964
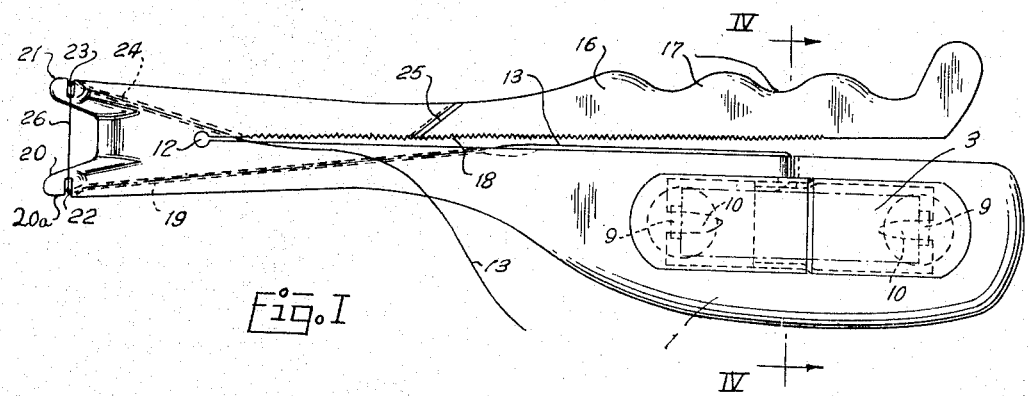
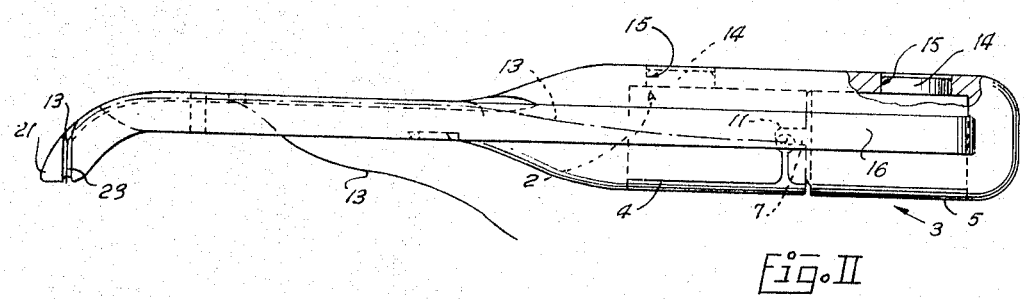
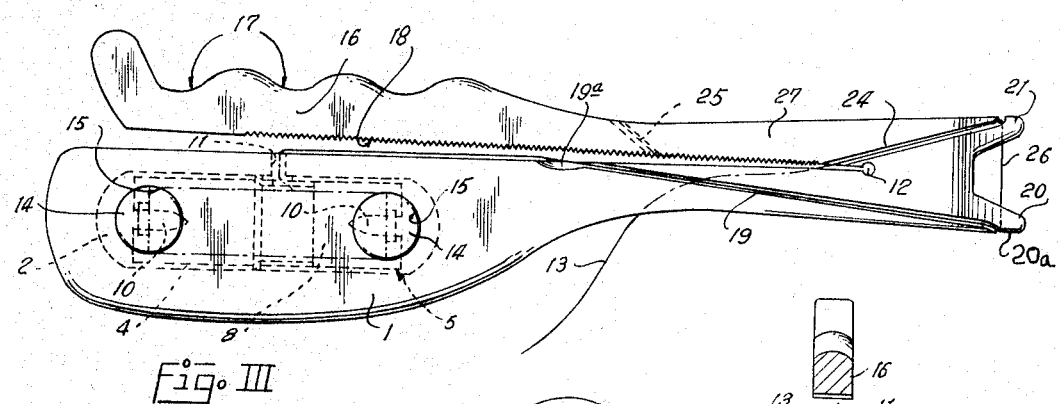
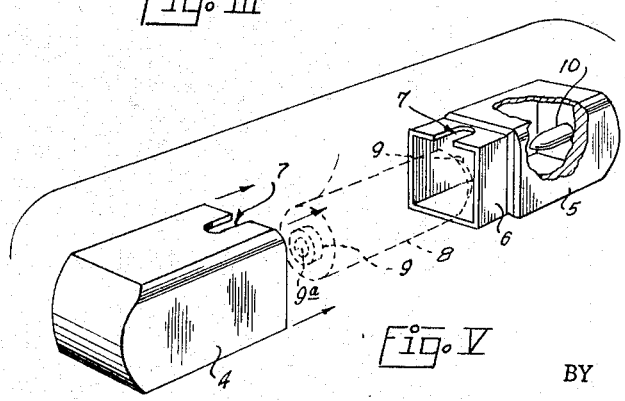
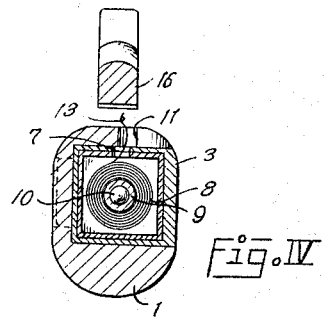
INVENTOR
Talmadge E. Foster
BY Howard E. Moore
ATTORNEY

United States Patent Office 3,311,116
Patented Mar. 28, 1967

3,311,116
DENTAL FLOSS HOLDER AND DISPENSER
Talmadge E. Foster, 6618 Belmead Drive,
Dallas, Tex. 75230
Filed Nov. 20, 1964, Ser. No. 412,753
5 Claims. (Cl. 132—92)

This invention is concerned with a dental floss holder and dispenser and is particularly concerned with improvements in such a device wherein the dental floss spool is disposed within a removable capsule in the handle of the device and the dental floss may be dispensed therefrom and held in taut position across the applicator end of the device while in use.

Dental floss is customarily sold in containers from which it may be dispensed and cut off in desired lengths to be placed between the teeth while held between the fingers of the user or the dentist.

The customary use of dental floss in the manner hereinbefore described, is an awkward procedure, especially when attempted to be used between the jaw teeth, and as a result the general use of dental floss is discouraged.

Dental floss holders and applicators have heretofore been proposed, but such devices incorporate certain objectionable features such as the difficulty of mounting the dental floss spool therein, difficulty in dispensing dental floss therefrom, lack of convenient means to hold the floss in taut position on the head and lack of facility in cleaning and maintaining same in sanitary condition.

The present invention provides a dental floss holder and dispenser which has the following objects and advantages:

(1) A quickly insertable and demountable dental floss spool holder is provided in the handle from which the dental floss may be easily and quickly dispensed.

(2) The insertable holder or capsule in which the dental floss spool is mounted, can be a disposable container for the dental floss spool as well as a dispenser, so that the dental floss may be sold in such container, and after being used up the container can be replaced by another container having therein a new spool of dental floss.

(3) The device is easy to thread for use, because all channels in which the dental floss is threaded, are exposed so that the dental floss thread can be laid therein without disassembling the device in any manner.

(4) All channels in which the dental floss thread is disposed are exposed exteriorly, thus permitting all surfaces, including said channels, to be thoroughly cleaned and sterilized. This is important when the device is used by a dentist on different patients.

(5) The dental floss thread may be clamped between the holder portion of the handle and a spring-like member constituting the opposite side of the handle by simply gripping the handle between the fingers, thereby holding the dental floss thread in taut position between the prongs of the applicator head; and the thread may be released to allow fresh thread to be pulled from the spool in the holder by simply releasing the grip on the handle.

Other and further objects of the invention will become apparent upon reading the detailed specification hereinafter following and by referring to the drawing annexed hereto.

A suitable embodiment of the invention is shown in the attached drawing wherein, FIGURE I is a bottom plan view of the dental floss holder and dispenser;

FIGURE II is a side elevational view thereof;

FIGURE III is a top plan view thereof;

FIGURE IV is a transverse sectional view taken along the line IV—IV of FIGURE I; and FIGURE V is a perspective exploded view of the spool holder cartridge.

Numeral references are employed to indicate the various parts shown in the drawings and like numerals indicate like parts throughout the various figures of the drawings.

The numeral 1 indicates a hollow handle shaped to conform to the contour of the hand, which has a substantially rectangular shaped cavity or receptacle 2 formed therein.

A hollow spool holder or capsule 3 has separable portions 4 and 5. An insertion extension 6 is provided on the spool holder portion 5, said insertion extension 6, being arranged to be slipped into the open end of the portion 4 with a friction fit.

Coinciding slots 7 are provided in the walls of the portion 4 and the extension 6, and are so arranged that when the extension 6 is inserted into the portion 4 a passage is provided through said slots 7 through which the dental floss thread may be extended as it is unwound from the spool 8.

The dental floss spool 8 has extensions 9 on the cylindrical core thereof, which extend beyond the ends of the dental floss thread 13 which is wound thereon. Each extension 9 is hollow and has central openings 9a in the end thereof in which the pins 10, attached to the inner ends of the capsule portions 4 and 5 are rotatably extended. The core 9 of the dental floss spool, may rotate about the pins 10, as the dental floss thread is dispensed from the spool 8.

A passage 11 is provided through the wall of the handle portion 1 and is aligned with slots 7 through which the dental floss thread 13 may be extended and dispensed.

Each hollow capsule section 4 and 5, has a cylindrical extension 14 extending from the side thereof.

Circular passages 15 are provided through the wall of the handle portion 1 and communicate with the cavity 2 therein in alignment with the extensions 14 when the capsule 3 is inserted into the cavity 2.

When the dental floss capsule 3 is assembled with the spool of dental floss therein it may be inserted into the cavity 2 and the extensions 14 inserted into the passages 15. The extensions 14 are slightly larger in diameter than the circular passages 15 and are preferably made of slightly deformable material, such as vinyl plastic or similar material, so that they have a friction fit in the passages 15 when forced thereinto, in order to maintain the capsule 3 in the cavity 2 until expelled therefrom, by pressing inwardly with the fingers of otherwise against the extensions 14 through the outer ends of the passages 15.

A handle portion 16 is joined to the handle portion 4 by the circular opening 12 provided through the head portion 27, of the dental floss holder and applicator. The inner edges of the handle portion 1 and the handle portion 16 are normally separated as indicated in FIGURE III by virtue of the fact that the inner ends of said surfaces begin at separated points on the circular border of the opening 12.

Finger grasping surfaces 17 are provided on the outer side of the handle portion 16 about which the fingers may be extended when the device is used or handled. Serrations or other roughened surfaces 18 may be provided on the inner side of the handle portion 16 to grippingly engage the dental floss strand 13 when extended therebetween in the manner hereinafter described. The head portion 27 is provided with prongs 20 and 21. The prongs 20 and 21 are turned angularly with reference to the axis of the body of the device, as indicated in FIGURE II for the purpose hereinafter mentioned.

An outwardly exposed diagonal slot 19 is formed along the upper surface of the head portion, which communicates with aligned slots 22 and 23 provided on the outer ends of the prongs 20 and 21. It will be noted that the slots 22 and 23 are also exteriorly exposed.

A diagonally return slot 24 is provided on the upper surface of the head portion 27 of the device which communicates with the space between the handle portions 1 and 16.

A diagonally disposed slot 25 may be provided in the opposite side of the handle portion 16 through which the free end of the dental floss thread 13 may be extended, and the slot 25 may have a cutting edge on the outer end thereof on which the used dental floss thread may be severed. The thread might also be severed by a cutting surface provided at another point on the handle or on one of the extensions 14.

The operation and function of the device hereinbefore described is as follows:

A spool of dental floss 8 is placed in the capsule 5 in the manner which will be obvious by an inspection of FIGURE V. The free end of the dental floss thread 13 is extended through the coinciding slots 7 and passage 11. The thread is then extended along the inner edge of the handle portion 1 and inserted in the exposed channel 19. It will be noted that the recessed guide surface 19a is provided on the inner surface of the handle portion 1 adjacent the inner end of the channel 19, to thereby facilitate the insertion of the thread into the channel.

The dental floss thread 13 is then inserted into the groove 22, it being noted that the outer end of the prong 20, as indicated at 20a is slightly cut away adjacent the groove 22 to facilitate the insertion of the thread into groove 22. The thread is then extended between the prongs 20 and 21 as it is inserted in the aligned groove 23 on the prong 21. This provides a portion 26 of the dental floss thread extending between the prongs 20 and 21. The dental floss thread 13 is then inserted in the exposed channel 24, extended between the inner surfaces of the handle portions 1 and 16 and inserted in the exposed groove 25 on the opposite side of the handle portion 16.

By grasping the handle portions 1 and 16 in the hand, with the fingers extended about the finger grips 17, and exerting inward force against the handle portions 1 and 16 by gripping same, the dental floss thread 13 is gripped between the inner surfaces of the handle portions 1 and 16 so that the thread cannot move and thereby the portion 26 which is inserted between the teeth of the user or patient is held in taut condition. Preferably the material out of which the holder dispenser is made, is of slightly springy material such as plastic or metal, so that when pressure is relieved from the handle portions 1 and 16, the handle portion 16 will spring away from the handle portion 1 and thereby relieve the gripping pressure on the dental floss thread 13 to allow additional dental floss thread to be dispensed in the manner hereinafter described. If desired a spring could be placed between the handle portions 1 and 16 to move them apart when relieved of pressure.

As the dental floss thread 13 is held in gripped condition between the handle portions 1 and 16, the head portion 27 may be inserted into the mouth and the dental floss portion 26 inserted between the teeth to provide the usual function of cleaning the inner surface of the teeth or removing foreign material from between the teeth.

It will be observed that by virtue of the inwardly directed angularly disposed ends on the prongs 20 and 21, the dental floss portion 26 may be conveniently placed in any position in the mouth so that it can be inserted between either the upper or lower teeth.

After the dental floss 26 is used pressure may be released on the handle portions 1 and 16, thereby allowing them to spring apart to release the dental floss thread 13. By pulling on the free end of the dental floss thread, fresh, unused dental floss may be dispensed from the spool 8 and positioned between the prongs 20 and 21. The used portion of the dental floss may be cut away either by a separate instrument or by a cutting edge provided on the outer end of the slot 25 or on the handle or the capsule, or at any other desired point on the device.

After removing the dental floss capsule 3 from the device, and the dental floss thread from the channels and slots provided thereon in which it is threaded, the entire device may be easily cleaned and sterilized as a unit, it being noted that all channels and cavities therein are exposed for cleaning and sterilization.

It will also be observed that the dental floss spool capsule 3 may be quickly and easily replaced as a unit and the dental floss may be sold in such a capsule for insertion in the device, or a new spool of dental floss may be inserted in a removable capsule which forms a part of the device.

It will be seen that I have provided a dental floss holder and dispenser wherein dental floss may be quickly and easily threaded and dispensed therefrom; wherein the portion of the dental floss inserted between the teeth is positively held in taut condition, which may be easily cleaned and sterilized, and is of such shape and configuration that it is convenient to handle and use.

It will be understood that other and further forms of my invention may be devised without departing from the spirit and scope of the appended claims.

Having described my invention I claim:

1. In a device of the class described, a body including a head portion with first and second handle portions extending therefrom; a cavity formed in the first handle portion; a separable capsule removably inserted in said cavity; a dental floss passage through the inner wall of the first handle communicating with the cavity; a dental floss passage through the wall of the capsule communicating with the passage through the wall of the first handle; a pair of spaced parallel inwardly directed prongs on the end of the head portion; a first diagonally disposed channel extending along the outer surface of the body and terminating at the inner edge of the first handle portion; aligned slots on the inner ends of the prongs; a second diagonally disposed channel extending along the outer surface of the body and terminating at the inner edge of the second handle portion, each of said channels communicating with one of the slots in the ends of the prongs; spring means normally urging the handle portions apart so that the handles may be moved together to grippingly engage dental floss extended through the channels and slots and between the handle portions, and when released will move apart by spring action to release the dental floss.

2. The combination called for in claim 1 wherein the capsule is exposed exteriorly of the first handle and may be inserted and moved from the cavity from exteriorly of the first handle.

3. The combination called for in claim 1 with the addition of spaced sockets in the bottom of the cavity, and extensions on the separable portions of the capsule frictionally inserted in the sockets to removably engage the capsule in the cavity.

4. The combination called for in claim 1 with the addition of a third channel on the inner surface of the second handle adapted to receive dental floss thread after being threaded through the first channel, the slots on the prongs, the second channel and extended between the handle portions.

5. In a dental floss dispenser and applicator, a body including a head portion and first and second spaced handles extending from the head; a pair of spaced parallel inwardly directed prongs on the outer end of the head; a dental floss capsule removably disposed in the first handle; a dental floss dispensing passage in the wall of the capsule; a dental floss dispensing passage extending through the inner wall of the first handle; a spaced pair of open channels on the outer surface of the body, one of said channels communicating with the inner side of one of the handles; and the other channel communicating with the inner side of the other handle, a transverse open slot in the outer end of each prong, each said slot communicating with one of the channels; the said body being made of spring-like material whereby the handles may be pressed together to clamp dental floss therebetween and when pressure is released will spring apart to release the dental floss.

References Cited by the Examiner

UNITED STATES PATENTS

| | | | |
|---|---|---|---|
| 1,260,011 | 3/1918 | Muchow | 132—92 |
| 1,479,364 | 1/1924 | Browne | 132—92 |
| 2,013,143 | 9/1935 | Getz | 132—92 |
| 2,187,442 | 1/1940 | Beach | 132—92 |
| 2,577,597 | 12/1951 | Wright et al. | 132—92 |

ROBERT E. MORGAN, *Primary Examiner.*

RICHARD A. GAUDET, *Examiner.*

R. L. FRINKS, *Assistant Examiner.*